United States Patent
Shapiro et al.

(10) Patent No.: US 8,423,206 B2
(45) Date of Patent: Apr. 16, 2013

(54) VARIABLE MAXIMUM COMMANDABLE ROLL RATE FOR DIRECTIONAL CONTROL DURING ENGINE-OUT ROLLING MANEUVER

(75) Inventors: Daniel R. Shapiro, Everett, WA (US); David Paul Eggold, Everett, WA (US)

(73) Assignee: The Boeing Company, Chicago, IL (US)

( * ) Notice: Subject to any disclaimer, the term of this patent is extended or adjusted under 35 U.S.C. 154(b) by 116 days.

(21) Appl. No.: 13/050,607

(22) Filed: Mar. 17, 2011

(65) Prior Publication Data
US 2012/0239227 A1    Sep. 20, 2012

(51) Int. Cl.
*G01C 23/00* (2006.01)
(52) U.S. Cl.
USPC .............................................................. 701/3
(58) Field of Classification Search ........................ None
See application file for complete search history.

(56) References Cited

U.S. PATENT DOCUMENTS

| | | | |
|---|---|---|---|
| 6,041,273 | A | 3/2000 | Burken et al. |
| 6,102,330 | A | 8/2000 | Burken et al. |
| 2008/0234880 | A1 | 9/2008 | Delporte et al. |
| 2010/0025544 | A1 | 2/2010 | Beaufrere |

OTHER PUBLICATIONS

European Search Report dated Jun. 22, 2012 for European Patent Application No. 12160210.6.
U.S. Appl. No. 12/499,900, filed Jul. 9, 2009.

*Primary Examiner* — Thomas Tarcza
*Assistant Examiner* — Adam Alharbi
(74) *Attorney, Agent, or Firm* — Ostrager Chong Flaherty & Broitman P.C.

(57) ABSTRACT

A system and a method for varying a maximum roll rate command for ensuring sufficient directional control during an engine-out rolling maneuver of a multi-engine aircraft. For a multi-engine airplane with a roll rate command flight control system, the primary flight control computer is used to vary the maximum commandable roll rate to preserve the desired control margins during roll maneuvers where the rudder is fully deflected to control a thrust asymmetry. When the engine-out yawing moment exceeds a specified value, the system sets a reduced limit on the amount of roll rate the pilot can command.

20 Claims, 7 Drawing Sheets

VARIABLE MAXIMUM COMMANDABLE ROLL RATE FOR DIRECTIONAL CONTROL DURING ENGINE-OUT ROLLING MANEUVER

BACKGROUND

The present disclosure relates generally to improving directional control on a multi-engine aircraft, and more particularly to ensuring sufficient directional control during roll maneuvers for an aircraft experiencing engine thrust asymmetry.

In typical multi-engine aircraft configurations, the aircraft engines may be mounted symmetrically on opposing wing structures or on opposing sides of the aircraft fuselage. This symmetrical mounting creates equivalent moment arms for each engine with respect to the vertical axis of the aircraft, which negates any yawing moment induced by any particular engine when both engines are producing equivalent thrust. However, in the event of an engine failure, asymmetric throttle command or some other event that results in one engine producing greater thrust than the opposing engine, several adverse effects may take place.

The primary effect of asymmetric thrust is that the aircraft will tend to yaw in the direction of the engine producing lower thrust because of the greater torque generated about the vertical axis by the engine producing the greater thrust. This effect is often compounded in an engine failure situation where an inoperative engine may produce additional drag while the compressor fan blades create a windmilling effect in response to the incoming airflow. To overcome and control this induced yaw, a counteracting yawing moment may be introduced by deflecting the rudder. When the rudder is deflected, the corrective yawing moment produced by the rudder about the aircraft's vertical axis is dependent upon the velocity of airflow across the rudder, which in turn is dependent on the air speed. As the aircraft decelerates, the rudder will need to be deflected further to maintain yaw control.

A problem arises, however, when a speed is reached where the yawing moment produced by the fully deflected rudder will just balance the thrust moment. If a roll maneuver is performed at this condition in the direction to roll towards the operative engine, there is no additional rudder deflection available to prevent the buildup of aircraft sideslip angle. Rudder deflection is often required during roll maneuvers, particularly at lower airspeeds, to oppose adverse yawing moment during a roll maneuver and to generate the required body axis yaw rate. If the required rudder deflection for a given roll rate is not used, the result may be an undesirable buildup of sideslip angle. Excessive sideslip angle in a roll may prevent the airplane from rolling at the rate and to the angle that the pilot intended. The amount of adverse sideslip angle may be dependent on the roll rate of the roll maneuver. This may occur primarily during a relatively low-speed rolling maneuver in which the aircraft is rolling toward the operative engine.

For a given change in bank angle, a high roll rate will produce a larger sideslip angle than a lower roll rate. Under normal operating conditions the rudder can deflect during rolling maneuvers to control this sideslip due to roll rate. In asymmetric thrust conditions, where the rudder can be fully deflected to control the thrust asymmetry, rolling maneuvers cause large sideslip angles because the rudder cannot be deflected further.

For multi-engine airplanes, a maneuver that may demand the greatest amount of directional stability and directional control power is a rapid rolling maneuver with high asymmetric thrust towards the higher thrust engine. Greater use of flight control augmentation has reduced vertical tail size requirements for traditional sizing conditions of directional stability and directional trim. Reducing the vertical tail size can cause the asymmetric thrust roll maneuver to be an important design condition.

Existing solutions include increasing the vertical tail size, increasing operating speeds, using a constant roll rate limiter, using a constant thrust reduction, or using a thrust reduction that is a function of roll rate.

Increasing the vertical tail size increases directional stability and leaves more rudder deflection available to control high roll rates. Increasing the vertical tail size, however, adds weight and drag to the aircraft in all conditions whether the additional directional stability is needed or not; thereby increasing its operating costs and reducing the airplane's value.

Increasing operating speeds has the same effect on control power as increasing the tail size. Increasing operating speeds, however, increases required takeoff and landing distances, thus decreasing available airport/payload combinations; thereby reducing the airplane's value.

Using a constant roll rate limiter would be beneficial, but would reduce aircraft roll rate in all situations, including those where large roll rates are controllable and might even be required; for example, in collision avoidance maneuvers or a recovery from an upset.

Using a constant thrust reduction would reduce the rudder required to control a thrust asymmetry, making it available to control the sideslip due to roll rate. Using a constant thrust reduction, however, can increase required takeoff distances and/or limit payload, thus decreasing available airport/payload combinations; thereby reducing the airplane's value.

Using a thrust reduction that is a function of roll rate and sideslip angle works the same way as a constant thrust reduction, but is designed to only operate in situations where additional directional control is needed. Using a thrust reduction that is a function of roll rate does not have the same drawbacks as using a constant thrust reduction, but it does present increased complexity as it needs to interface with not only the flight control system but also the engine control system.

There is a need for a solution that is free of the drawbacks of existing solutions.

SUMMARY

Various embodiments of a system for varying a maximum roll rate command for directional control during an engine-out rolling maneuver of a multi-engine aircraft are disclosed herein. For a multi-engine airplane with a roll rate command flight control system, the primary flight control computer is used to vary the maximum commandable roll rate to preserve the desired control margins during roll maneuvers while the rudder is fully deflected to control a thrust asymmetry. For example, in accordance with some embodiments, when the engine-out yawing moment exceeds a specified value, the system sets a reduced limit on the amount of roll rate the pilot can command.

The methods of reducing maximum commandable roll rate disclosed herein allow a roll rate change to be used for preserving desired directional control margins without unnecessarily limiting the roll rate for typical engine-out conditions where a full roll rate is needed to meet airplane maneuvering requirements. These are conditions where full rudder is not needed for trim and therefore a full roll rate can be performed with adequate control of sideslip.

In many cases, an airplane's lateral controls are sized to provide necessary roll authority even in the presence of failures which render some of the lateral controls unusable. This results in an excess lateral control capability without these failures. Because of this surplus of lateral control, the airplane can develop large roll rates in excess of what is required for normal operation. The systems disclosed herein only limit roll rate to the extent required to preserve directional control, preserving enough roll rate authority to perform required maneuvering.

One aspect of the invention is a system to assure a desired control margin on a multi-engine aircraft for roll maneuvers conducted with a large thrust asymmetry. In accordance with the embodiments disclosed herein, this system comprises a primary flight control computer with new logic to automatically reduce the limit on commanded roll rate. The commanded roll rate is limited only during asymmetric thrust conditions when additional rudder deflection is not available to achieve desired roll characteristics at higher roll rates.

In accordance with various embodiments, the system accepts calculated engine-out yawing moment data or other parameters that indicate the magnitude of the yawing moment asymmetry. In accordance with one embodiment, when the engine-out yawing moment (or coefficient thereof) exceeds a specified value, the system sets a reduced limit on the amount of roll rate the pilot can command. The selection of limited or not-limited allowable roll rate is made in response to a signal from a hysteresis switch which prevents toggling of the limit with changing engine-out yawing moment.

Parameters that indicate the magnitude of the yawing moment asymmetry also indicate when additional rudder deflection is not available for roll maneuvers. The yawing moment capability of the rudder is known to the airplane designer. When the yawing moment of the thrust asymmetry approaches the yawing moment capability of the rudder, then it is known that there is little additional rudder to be used during roll maneuvers. Also, the amount of rudder available is proportional to the magnitude of the yawing moment of the thrust asymmetry.

The methods of flight control disclosed herein have the benefit of being implemented in an existing flight control computer as a small addition to roll rate command control law software. Cost savings and avoidance come in the form of a small vertical tail. No recurring costs from the increased weight and drag from a larger vertical tail are required. The systems disclosed herein can also avoid cost or loss of value due to reduced airplane capability imposed by increasing takeoff/approach speeds or reduced engine thrust.

The above-described subject matter may also be implemented in various other embodiments without departing from the scope of the appended claims. These and various other features will be apparent from a reading of the following Detailed Description and a review of the associated drawings.

BRIEF DESCRIPTION OF THE DRAWINGS

Reference will hereinafter be made to the drawings in which similar elements in different drawings bear the same reference numerals.

DETAILED DESCRIPTION

Figure 1:
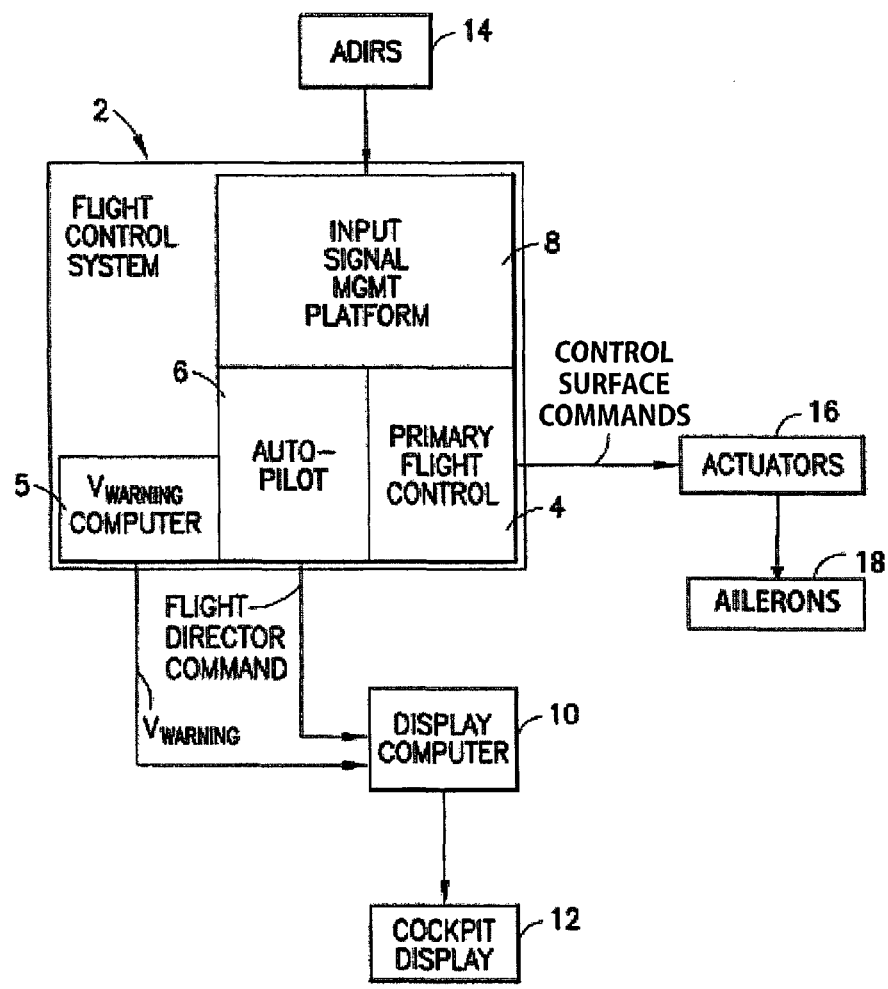
FIG. 1 is a high-level block diagram showing components of an aircraft control system that can be programmed to provide the novel functionality disclosed herein.

FIG. 1 is a block diagram showing hardware components of a flight control system of a type which already exists on modern airplanes. The air-data system and inertial reference system (ADIRS) 14 comprises an air data part that provides airspeed, angle of attack, temperature and barometric altitude data, while the inertial reference part gives attitude, flight path vector, ground speed and positional data to an input signal management platform 8 of a flight control system 2. The flight control system 2 comprises a primary flight control computer/function 4 and an auto-pilot computer/function 6. The primary flight control computer 4 and auto-pilot computer 6 could have independent input signal management platforms. The flight control system 2 further comprises a warning speed computer/function 5 that calculates the minimum airspeed that provides acceptable airplane lateral and directional control in the presence of thrust asymmetry (hereinafter "warning speed" or "$V_{WARNING}$"), based on information acquired by the ADIRS 14 and other information that will be described in detail later herein with reference to FIGS. 5 and 6. (The warning speed computer could alternatively be incorporated in either the autopilot computer or the primary flight computer.) The warning speed computer 5 sends the calculation result to a display computer 10 that controls a cockpit display 12.

The warning speed computer 5 also sends the calculation result to the autopilot computer 6, which uses the warning speed $V_{WARNING}$ and other information to generate various autoflight commands that are sent to the primary flight control computer 4. When the autopilot is engaged, the primary flight control computer 4 outputs an elevator command to the elevator actuators (not shown in FIG. 1) based at least partly on those commands from the autopilot computer 6. Alternatively, the autopilot computer 6 could generate the required elevator command independent from the primary flight control computer 4. The elevator command is determined based on the desired angular setting of the elevators. The elevators are used to perform pitching maneuvers and also serve to adjust the aircraft's attitude with respect to the ground for takeoff and landing. When the flight director is engaged, the auto-pilot computer 6 provides a flight director pitch attitude guidance cue (shown as "Flight Director Command" in FIG. 1).

In accordance with one embodiment, the cockpit display includes a visual indication of the calculated warning speed $V_{WARNING}$ sent by the warning speed computer 5 to the display computer 10. The warning speed $V_{WARNING}$ is displayed on a speed tape in a manner that provides a clear, unambiguous indication of a minimum safe speed that is clearly distinguishable from other symbols displayed on modern cockpit displays.

Although not shown in FIG. 1, the primary flight control computer 4 comprises a roll rate command system which is responsive to commands from the aircraft pilot. The commanded roll rate is inputted by the pilot by turning a pilot wheel or pushing a stick. During rolling of the aircraft, the roll rate is measured by a roll rate gyroscope contained in the ADIRS 14. This measured roll rate is compared to the commanded roll rate. The primary flight control computer then outputs control surface commands to the aileron actuators 16, which commands are a function of the difference between the measured and commanded roll rates. In response to the control surface commands, the actuators 16 deflect a pair of ailerons 18 in opposite directions to induce rolling. The primary flight control computer also controls deflection of the rudder (not shown in FIG. 1).

Various embodiments of a system for varying a maximum roll rate command for directional control during an engine-out rolling maneuver of a multi-engine aircraft will now be disclosed with reference to FIGS. 2-5. The primary flight control computer is programmed to vary the maximum commandable roll rate provided to the roll rate command system in response to the detection of high thrust asymmetry. For example, in accordance with some embodiments, when the engine-out yawing moment exceeds a specified value, the system sets a reduced limit on the amount of roll rate the pilot can command. The engine-out yawing moment is proportional to the amount of rudder used to control the thrust asymmetry. This allows maximum commandable roll rate to be reduced when additional rudder deflection is not available for control of a high roll rate maneuver.

Various embodiments of a software module for providing a roll rate limit to a conventional roll rate command system 40 will now be disclosed with reference to FIGS. 2 through 5.

Figure 2:
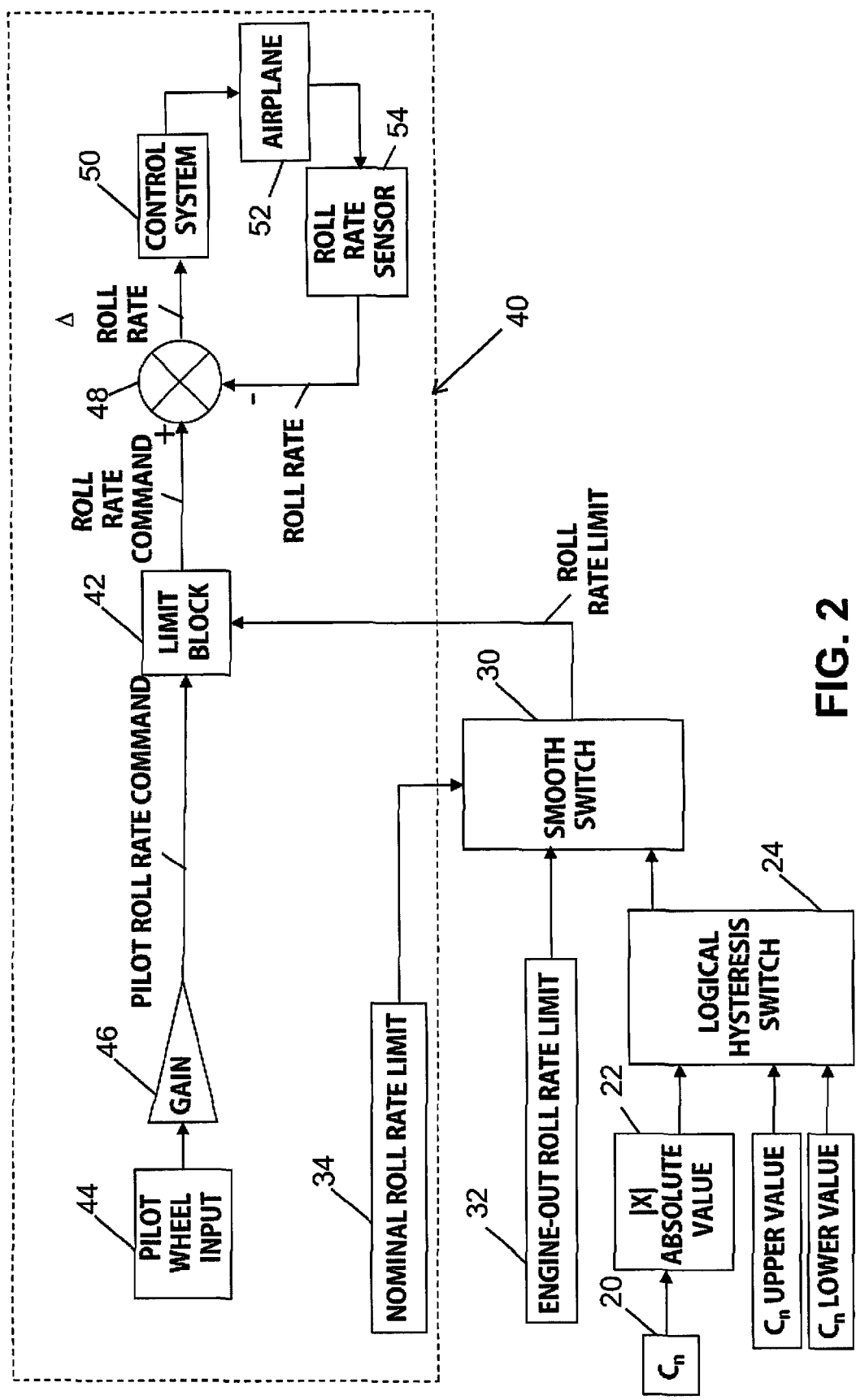
FIGS. 2 through 5 are block diagrams showing portions of a flight control system in accordance with various embodiments.

Referring to FIG. 2, when the pilot wants the aircraft to roll, he or she turns a pilot wheel, generating a pilot wheel input signal 44. (Alternatively, the input signal can be produced by pushing a stick.) That input signal is multiplied by a gain 46. The resulting pilot roll rate command is then inputted to a limit block 42. In a conventional roll rate command system, the limit block 42 outputs a roll rate command which is equal to the pilot roll rate command if the latter does not exceed a prestored nominal roll rate limit, but outputs a roll rate which is equal to the nominal roll rate limit if the pilot roll rate command exceeds the nominal roll rate limit. The nominal roll rate limit is typically selected as a function of various factors. The roll rate command output by limit block 42 is inputted to means 48 (a circuit or a software module) for determining the difference (Δ roll rate) between that roll rate command and a signal representing the roll rate of the airplane 52 as measured by a roll rate sensor 54. The difference signal is then outputted to the roll rate control system 50, which comprises actuators (see block 16 in FIG. 1) coupled to respective ailerons (see block 18 in FIG. 1). The actuators cause the ailerons to deflect in dependence on the magnitude of the difference between the commanded and measured roll rates.

In accordance with the embodiment depicted in FIG. 2, a software module varies the roll rate limit setting in limit block 42 as a function of the aircraft yawing moment coefficient during an engine-out rolling maneuver of a multi-engine aircraft. In the absence of high thrust asymmetry, a nominal roll rate limit 34 can be used by limit block 42. Alternatively, in the presence of high thrust asymmetry, an engine-out roll rate limit 32 can be substituted for the nominal roll rate limit in limit block 42, which engine-out roll rate limit is below (i.e., less than) the nominal roll rate limit. In accordance with an alternative embodiment, the functionality shown in FIG. 2 could be implemented in hardware rather than software.

As used herein, the term "engine-out roll rate limit" means the roll rate limit set in response to an aircraft having high thrust asymmetry due to either failure of an engine or a large difference in the respective thrusts of two engines. The engine-out roll rate limit can be a function of flap setting, angle of attack, and any of the independent parameters used for the nominal roll rate limit. The values for the engine-out roll rate limit and the types of independent parameters (like flap setting and angle of attack) are in turn dependent on the airplane configuration and its maneuver requirements.

Preferably, a smooth switching between the nominal and engine-out roll rate limits is performed by a software module comprising a logical hysteresis switch 24 and a smooth switch 30. A nominal roll rate limit and an engine-out roll rate limit are stored in respective registers in or accessible by the smooth switch 30. The functionality of the smooth switch 30 is activated when the output of the hysteresis switch 24 changes from one state to another state (e.g., from TRUE to FALSE).

The smooth switch 30 uses transition logic that ramps its output signal between two different input values over some determined time constant, e.g., 1 second, when the state of the output signal from the hysteresis switch 24 changes between TRUE and FALSE. There are several ways of doing this. One way uses weighting factors to weight both inputs. One input is weighted completely (100%) at the beginning (the other is zero). These weighting factors vary linearly over time until the first input's weighting factor equals zero and the second input's weighting factor equals 100%. For example, software could be written such that the output of the smooth switch 30 will transition (linearly) from the nominal roll rate limit 34 to the engine-out roll rate limit 32 in response to a transition of the output of the hysteresis switch 24 from TRUE to FALSE, which in turn occurs in response to a transition of the yawing moment (or a parameter that is a function thereof) from below a threshold to above that threshold when thrust asymmetry is high. Conversely for this example, the output of the smooth switch 30 will transition (linearly) from the engine-out roll rate limit back to the nominal roll rate limit in response to a transition of the output of the hysteresis switch 24 from FALSE to TRUE.

The hysteresis switch 24 receives a signal representing the absolute value 22 of a yawing moment coefficient ($C_n$) 20 of the aircraft. Upper and lower thresholds for $C_n$ are stored in registers in or accessible to the hysteresis switch 24, the lower threshold being less than the upper threshold in magnitude. The hysteresis switch comprises logic for determining when $|C_n|$ transitions from a value less than the upper threshold to a value greater than the upper threshold; and for determining when $|C_n|$ transitions from a value greater than the lower threshold to a value less than the lower threshold. In response to the transition from below to above the upper threshold, the output of hysteresis switch 24 transitions from TRUE to FALSE, thereby causing the roll rate limit supplied to limit block 42 to transition from the nominal roll rate limit to the engine-out roll rate limit. Conversely, in response to the transition from above to below the lower threshold, the output of hysteresis switch 24 transitions from FALSE to TRUE, thereby causing the roll rate limit supplied to limit block 42 to transition from the engine-out roll rate limit back to the nominal roll rate limit.

In accordance with a further aspect of the embodiment depicted in FIG. 2, the engine-out roll rate limit 32 can be selected from a schedule of roll rate limits. A certain amount of analysis is necessary to generate an appropriate roll rate limit schedule for any given aircraft. Analysis could consist of using engineering simulators, flight testing, or some other method. A person skilled in the art of flight dynamics and controls can generate such a schedule and implement it (or understand how to implement it) into the disclosed control system without undue experimentation.

One way in which the roll rate limit schedule can be generated for a given aircraft configuration will now be described. This schedule would then be implemented in the system depicted in FIG. 1. The implementer would first define criteria for controllability during asymmetric thrust maneuvering and test conditions at which to evaluate these requirements. These criteria may include maximum sideslip angle developed during the maneuver, maximum lateral control used during the maneuver, or some other criteria of importance to indicate that a roll maneuver is performed with the desired characteristics. The test maneuvers may include rolling the aircraft (with a thrust asymmetry) from some initial bank angle to different bank angles. The maneuver may then require the aircraft to maintain the target bank angle without rolling back. The values for these criteria and the types of maneuvers would be chosen to reflect the type of aircraft, intended use of the aircraft, expected performance for the maneuvers, and the types of operating environments the aircraft might encounter. For example, transport aircraft with different configurations affecting roll, yaw characteristics and thrust asymmetry control, may have different values for the criteria that define the acceptable levels on control for the same roll maneuver. Also, highly maneuverable aircraft will have different roll maneuvers to evaluate than transport aircraft. Using these maneuvers and criteria, a study would be conducted to measure the aircraft's characteristics, relative to the criteria, during asymmetric thrust conditions at a variety of different flight conditions. For example, for a given airplane configuration (e.g. flap setting or trimmed angle of attack, etc.) the aircraft is evaluated at a variety of roll rates. The maximum roll rate at which the maneuver is complete while meeting the criteria becomes the roll rate limit for that configuration and flight condition. These limits can be tabulated as a function of angle of attack, flap setting, thrust asymmetry, etc. and then compiled into the roll rate limit schedule.

Using the foregoing technique, the flight control system is able to reduce the commandable roll rate limit to maintain directional control during an engine-out rolling maneuver of a multi-engine aircraft when remaining rudder deflection is not sufficient for the nominal roll rate limit.

Figure 3:
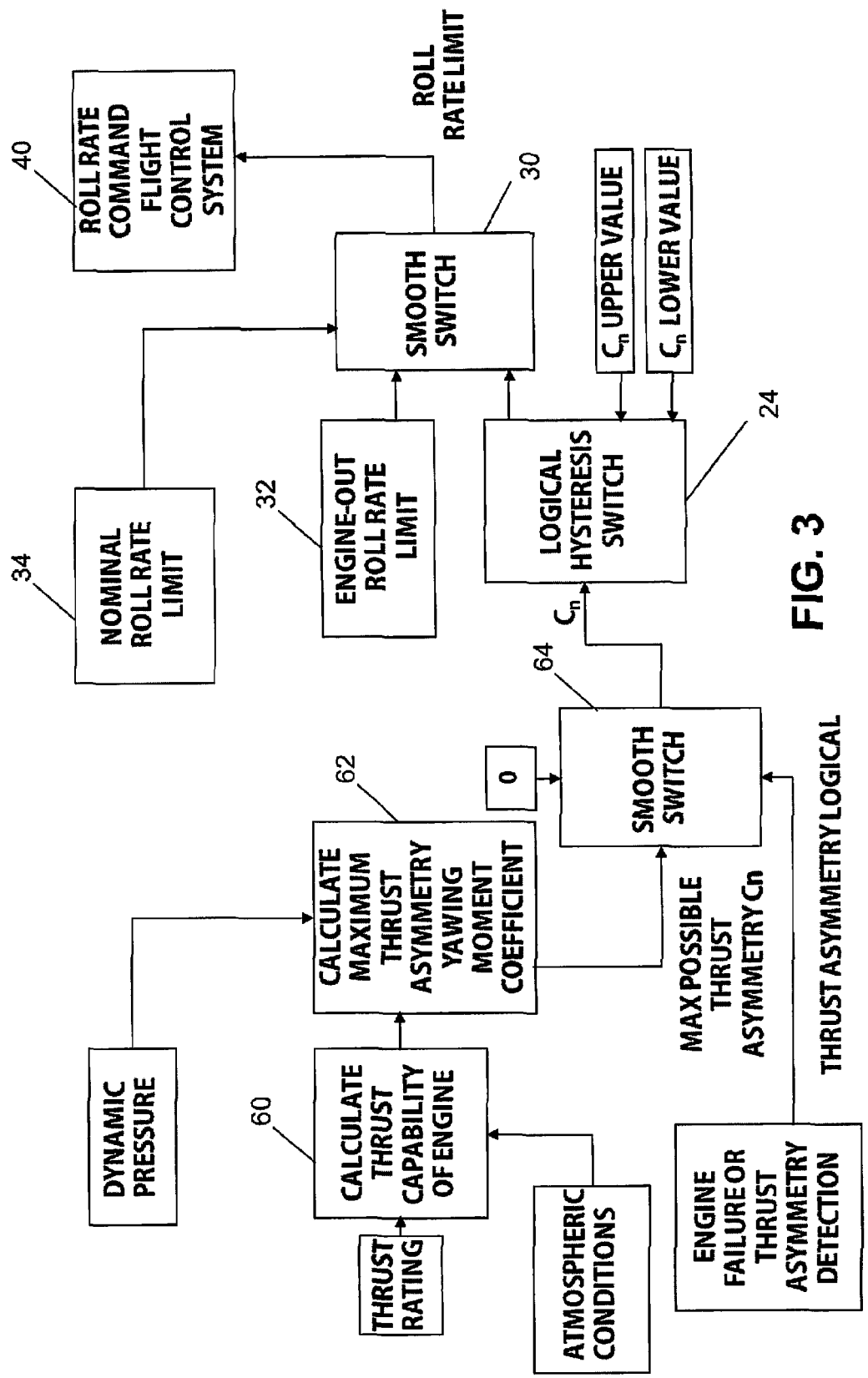

In accordance with a second embodiment depicted in FIG. 3, a software module first calculates the thrust capability of the operative engine as a function of at least the thrust rating and atmospheric conditions (block 60) and then calculates the maximum possible thrust asymmetry yawing moment coefficient $C_n$ (block 62) as a function of at least the calculated thrust capability and the dynamic pressure. That maximum possible thrust asymmetry yawing moment coefficient $C_n$ is passed to the previously described logical hysteresis switch 24 by a smooth switch 64 in response to receipt of a thrust asymmetry logical signal indicating that an engine failure or a sufficiently high thrust asymmetry has been detected. Means for detecting an engine failure and means for detecting the thrust of an engine are well known. Preferably, the smooth switch 64 uses transition logic that ramps its output signal between 0 and $C_n$ over 1 second when the state of the thrust asymmetry logical signal changes between TRUE and FALSE.

The hysteresis switch 24 receives the signal representing the maximum possible thrust asymmetry yawing moment coefficient ($C_n$) of the aircraft. The hysteresis switch comprises logic for determining when $C_n$ transitions from a value less than the upper threshold to a value greater than the upper threshold; and for determining when $C_n$ transitions from a value greater than the lower threshold to a value less than the lower threshold. In response to the transition from below to above the upper threshold, the output of hysteresis switch 24 transitions from TRUE to FALSE. Conversely, in response to the transition from above to below the lower threshold, the output of hysteresis switch 24 transitions from FALSE to TRUE.

As previously described with reference to FIG. 2, the smooth switch 30 uses transition logic that ramps its output signal between two different input values over a determined time constant, e.g., 1 second, when the state of the output signal from the hysteresis switch 24 changes between TRUE and FALSE. Preferably, the output of the smooth switch 30 will transition (linearly) from the nominal roll rate limit 34 to the engine-out roll rate limit 32 in response to a transition of the output of the hysteresis switch 24 from TRUE to FALSE. Conversely for this example, the output of smooth switch 30 will transition (linearly) from the engine-out roll rate limit back to the nominal roll rate limit in response to a transition of the output of the hysteresis switch 24 from FALSE to TRUE. The output of smooth switch 30 sets the roll rate limit in the limit block (previously described) of the roll rate command system 40.

Figure 4:
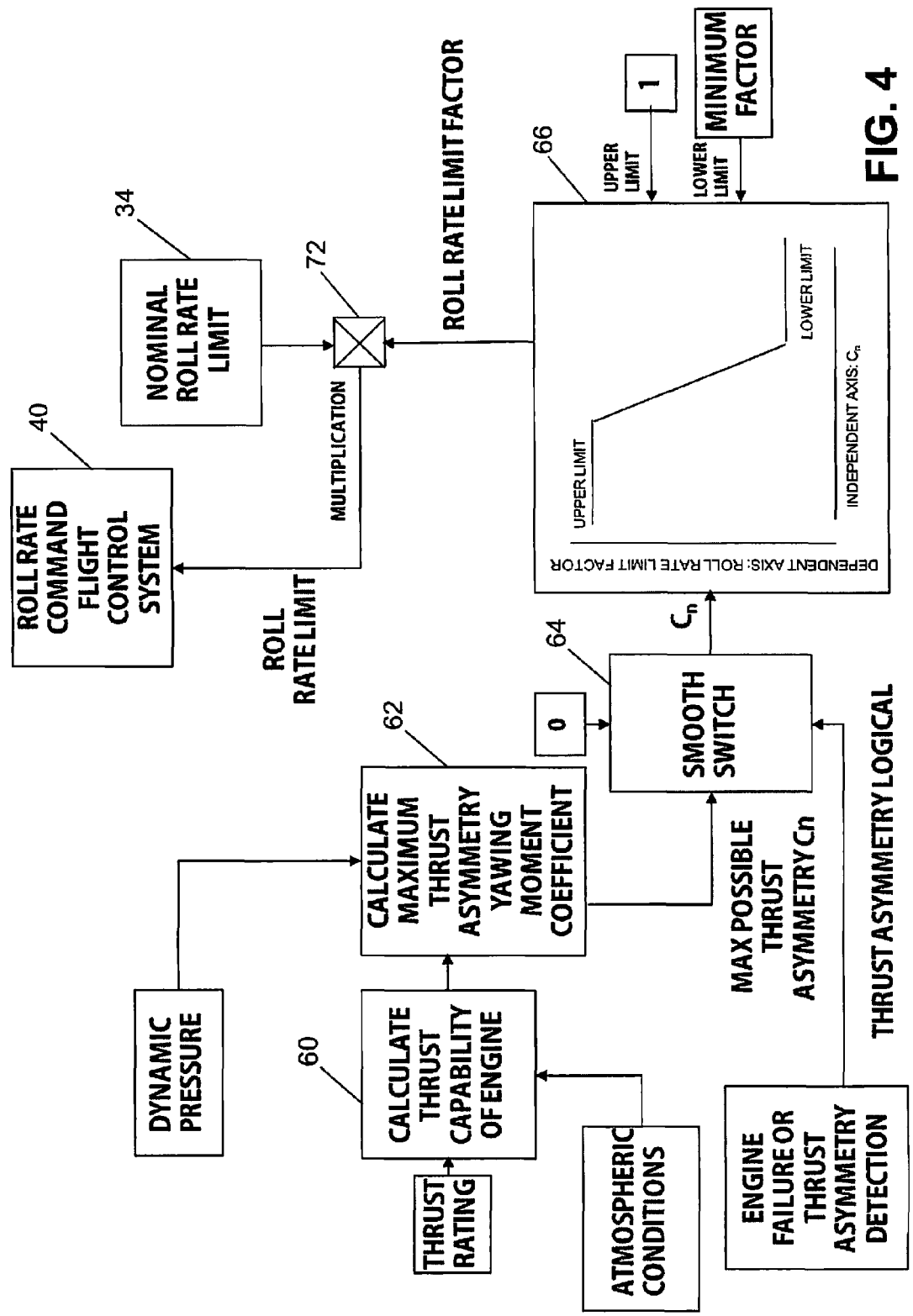

An alternative embodiment is depicted in FIG. 4. The differences between the embodiments respectively shown in FIGS. 3 and 4 are that the means for setting the roll rate limit as a function of the $C_n$ output by smooth switch 64 are a logical hysteresis switch 24 and a smooth switch 30 in FIG. 3, but are a schedule 66 of roll rate limit factor versus $C_n$ and a multiplier 72 in FIG. 4.

Referring to FIG. 4, in the presence of high thrust asymmetry, a reduced roll rate limit can be derived by multiplying the nominal roll rate limit 34 by an engine-out roll rate limit factor which lies in a range bounded by upper and lower limits. The upper factor limit equals unity, whereas the lower factor limit is equal to a minimum factor that is greater than zero and less than unity. The engine-out roll rate limit factor is determined by reference to schedule 66 of roll rate limit factor versus maximum possible thrust asymmetry yawing moment coefficient $C_n$. This schedule takes the form of a look-up table in which data representing a roll rate limit factor is output in response to the input of data representing $C_n$.

In the exemplary schedule depicted in FIG. 4, the roll rate limit factor will be unity if the $C_n$ is less than a lower threshold; and will be equal to a minimum factor if $C_n$ is greater than an upper threshold. As seen in FIG. 4, for $C_n$ in the range bounded by the lower and upper thresholds, the roll rate limit factor will vary linearly from unity to the minimum factor. However, the portion of the schedule 66 between the upper and lower limits need not be a straight line. The roll rate limit factor corresponding to the particular value of $C_n$ is used by a multiplier 72 to derive a roll rate limit by multiplying the roll rate limit factor and the nominal roll rate limit. The resulting roll rate limit is used by the limit block of the roll rate command system 40 in the manner previously described with reference to FIG. 2.

As used herein, the term "minimum factor" is the lowest factor that the engine-out roll rate limit factor can be. Put another way, this creates the lowest roll rate limit due to thrust asymmetry. The value for this factor is determined to meet the combined requirements of roll performance and directional control. (Limit roll rate enough to meet directional control requirements, but not more than necessary; thereby preserving required roll rate performance.)

Figure 5:
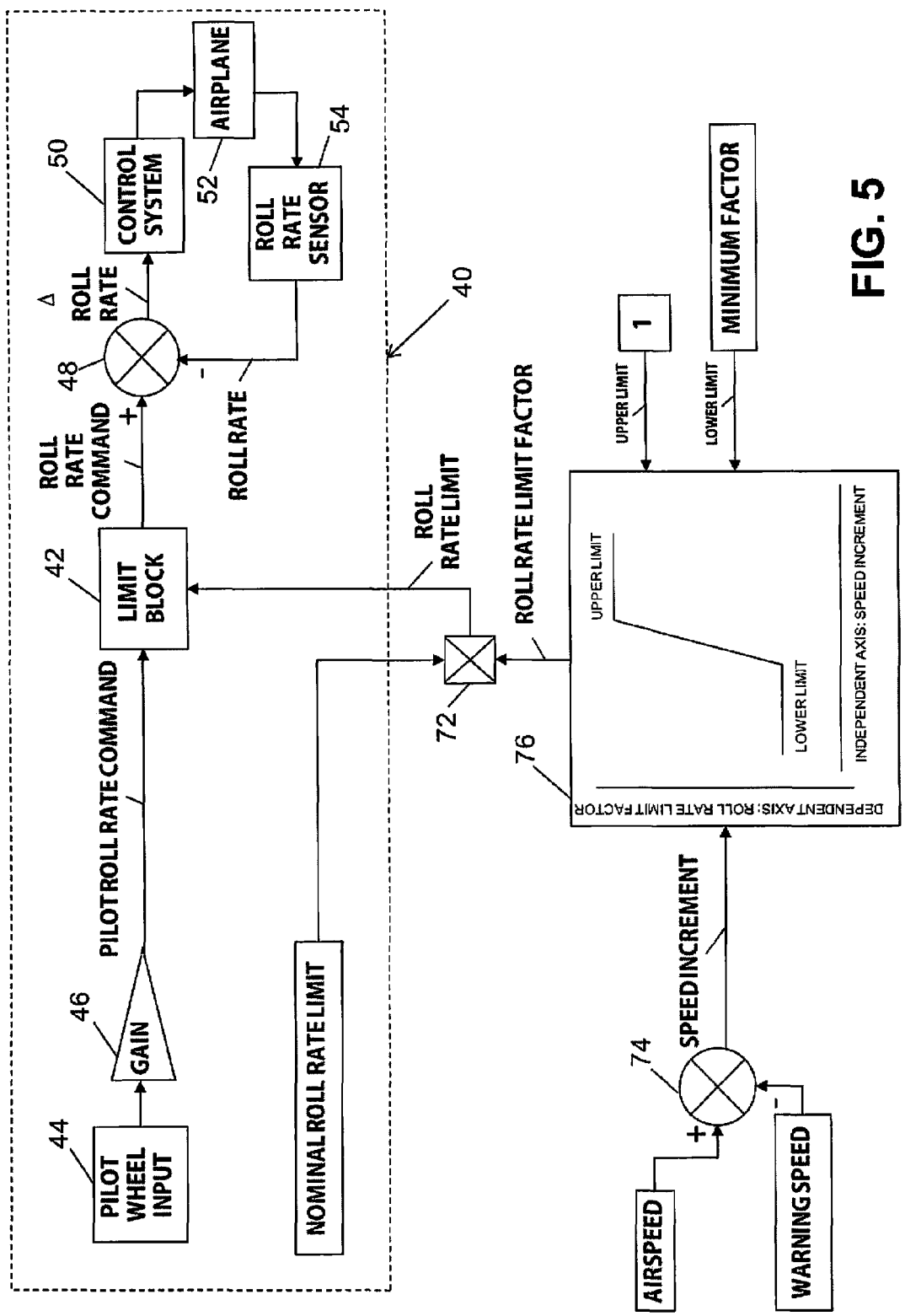

FIG. 5 depicts a further embodiment of the invention in which the engine-out roll rate limit factor is determined as a function of the difference (hereinafter "speed increment") between the airspeed of the aircraft and a warning speed (i.e., the minimum airspeed that provides acceptable airplane lateral and directional control in the presence of thrust asymmetry). Again, in the absence of high thrust asymmetry, the nominal roll rate limit is used by the limit block 42 of the roll rate command system 40. Alternatively, in the presence of high thrust asymmetry, a reduced roll rate limit can be derived by multiplying the nominal roll rate limit by an engine-out roll rate limit factor which lies in a range bounded by upper and lower limits. Again, the upper limit equals unity, while the lower limit is equal to a minimum factor that is greater than zero and less than unity. The schedule in block 76 allows one to designate a speed (either faster or slower than the warning speed) at which the roll rate command system will begin to limit the allowable roll rate.

In accordance with the embodiment shown in FIG. 5, the engine-out roll rate limit factor is determined by reference to a schedule 76 of roll rate limit factor versus speed increment. This schedule takes the form of a look-up table in which data representing a roll rate limit factor is output in response to the input of data representing a speed increment. The speed increment is produced by a summer 74, which subtracts the warning speed from the airspeed. Means for determining the warning speed will be described later with reference to FIGS. 6 and 7; means for determining the airspeed of an aircraft in flight are well known.

In the exemplary schedule depicted in FIG. 5, the roll rate limit factor will be unity if the speed increment is greater than an upper threshold; and will be equal to the minimum factor if the speed increment is less than a lower threshold. For speed increments in the range bounded by the lower and upper thresholds, the roll rate limit factor will vary linearly from the minimum factor to unity with increasing speed increment. However, the portion of the schedule between the upper and lower limits need not be a straight line. The roll rate limit factor corresponding to the particular speed difference is used by multiplier 72 to derive a roll rate limit by multiplying the roll rate limit factor and the nominal roll rate limit. The resulting roll rate limit is used by a limit block 42 of the roll rate command system 40 in the manner previously described with reference to FIG. 2.

A method for calculating a warning speed ($V_{WARNING}$) that corresponds to the current magnitude of the thrust asymmetry based on lateral and directional control capabilities will now be described with reference to FIG. 6. In this disclosed embodiment, the warning speed is calculated by the warning speed computer (item 5 in FIG. 1), which sends the calculated warning speed to the primary flight control computer 4 (for use by the embodiment depicted in FIG. 5), the autopilot 6, and the display computer 10. In the process, the warning computer also calculates the yawing moment coefficient, which is used by the embodiment depicted in FIG. 2.

Figure 6:
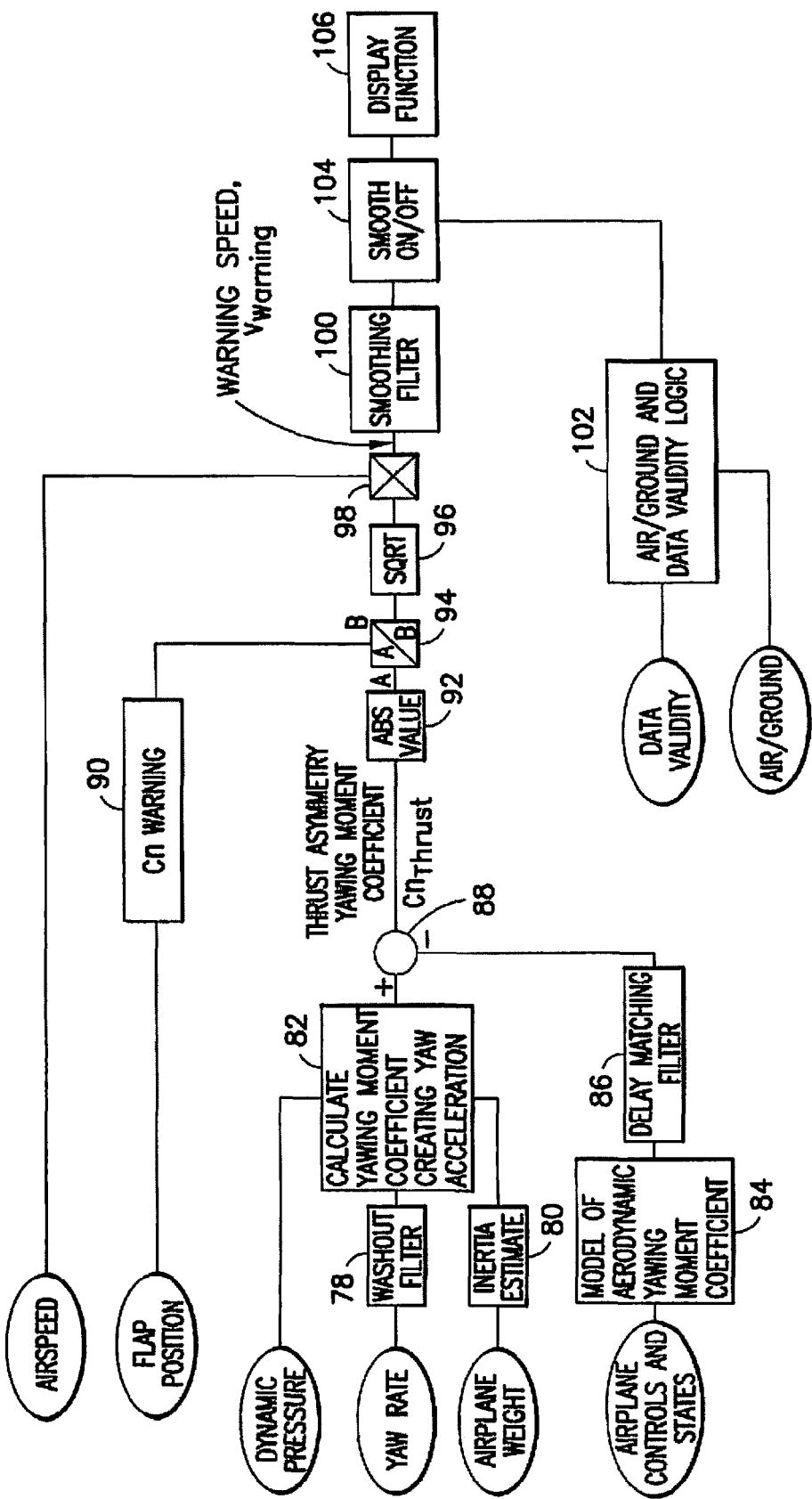
FIG. 6 is a block diagram showing one method for calculating and displaying a warning speed for thrust asymmetry control.

The method shown in FIG. 6 provides a real-time calculation that enables the display to show the current minimum safe airspeed as the thrust asymmetry changes and avoids speed restrictions or warnings where they are not needed and provides awareness of the current margin of remaining control power. For example, as the operating engine(s) at high thrust is(are) throttled back to lower thrust, the pilot will see that the minimum speed will decrease on the display, showing that the airplane is further from its lateral and directional control limits. This capability will be illustrated following the description of the calculation method.

Referring to FIG. 6, block 82 calculates the yawing moment coefficient creating yaw acceleration. This block converts measured yaw acceleration into the total airplane yawing moment coefficient. To do this, two generally known equations are used. The first relates yaw acceleration $\dot{r}$ to total airplane yawing moment N and airplane yaw moment of inertia $I_{zz}$:

$$\dot{r} = N \cdot I_{zz}$$

Yaw acceleration is approximated by passing the measured airplane yaw rate through a washout filter 78 and additional filtering to reduce signal noise. Airplane yaw moment of inertia may be approximated as being a function of airplane weight in block 80. Airplane weight is a quantity that may be obtained as a signal from existing airplane systems. From this information, total airplane yawing moment N can be calculated.

The second equation converts dimensional yawing moment into a yawing moment coefficient:

$$C_n = \frac{N}{\bar{q} \cdot S \cdot b}$$

where dynamic pressure $\bar{q}$ is known from airplane air data systems and the values of wing area S and wing span b are known constants for the airplane. This calculates the total airplane yawing moment coefficient. It is the sum of all yawing moments acting on the airplane including that from aerodynamics and propulsion systems.

Still referring to FIG. 6, the aerodynamic yawing moment coefficient is modeled in block 84. This block estimates the component of total airplane yawing moment coefficient that is generated by aerodynamic forces. This may include contributions such as yawing moment due to rudder deflection, airplane sideslip angle, airplane angular rates (roll rate, yaw rate), and lateral control deflection. It is common practice in the industry to generate and use models of airplane aerodynamic forces and moments across the flight envelope and range of configurations of the airplane. Block 84 implements such a model for the aerodynamic yawing moment coefficient. This model may be simplified and tailored to the flight conditions and airplane configurations for which the airplane could be flying near its control limitations with a thrust asymmetry.

The aerodynamic model $C_{n}$ output by block 84 is processed through a simple delay matching filter 86 so that the output signal has the same total time delay as the total airplane yawing moment coefficient calculated from yaw acceleration. This filter is used on this signal when the total time delay of the input signals and computation are less than the time delays of the input signals, filtering and calculation of the total airplane yawing moment coefficient signal.

The thrust asymmetry yawing moment coefficient can then be calculated by subtracting the aerodynamic effects from the total airplane yawing moment in junction 88. This calculation uses the assumption that the airplane engines and the modeled aerodynamics are the only sources of total airplane yawing moment. Another significant contributor is the effect of forces on the landing gear while the airplane is on the ground. Since this system is not intended to operate on the ground, and logic is included to prevent display of a warning speed on the ground, the gear force contribution can be ignored. The simplified equation for total airplane yawing moment and the equation for the thrust asymmetry yawing moment coefficient are as follows:

$$N_{total} = N_{Aero} + N_{Thrust}$$

$$C_{n_{Thrust}} = C_{n_{Total}} - C_{n_{Aero}}$$

As shown in FIG. 6, the thrust asymmetry yawing moment coefficient is then subject to an absolute value function 92 to remove the directional information but retain the magnitude. This serves to allow all later computations to produce the same output whether the thrust asymmetry tends to yaw the airplane to the left or to the right.

The next step is to use current airspeed and a $C_n$ value for the warning to compute a warning airspeed $V_{WARNING}$. As is typical in the design and analysis of multi-engine airplanes, the capability to control a thrust asymmetry can be expressed in terms of a thrust asymmetry yawing moment coefficient. A single value of yawing moment coefficient can be chosen to represent a certain degree of airplane control for a given airplane configuration. Using this non-dimensional parameter allows the quick calculation of the airspeed that will provide that same degree of airplane control for a range of thrust asymmetries which can vary with altitude, temperature and selected thrust limit. In a similar way, a $C_n$ value is chosen to correspond to the degree of airplane control at which the thrust asymmetry warning is desired. FIG. 6 shows this $C_n$ value (block 90) as being a function of the airplane flap position but it could be implemented as a constant or a function of more or different parameters.

The current calculated value of the thrust asymmetry yawing moment coefficient is used to calculate the warning speed using the following equation:

$$V_{Warning} = V_{current} \cdot \sqrt{\frac{C_{n_{Thrust}}}{C_{n_{Warning}}}}$$

This equation is implemented by means of a divider 94, a square root function block 96 and a multiplier 98. The output of multiplier may be sent to a smoothing filter 100 to reduce noise in the signal.

The warning speed display 106 may need to be removed or disabled for a variety of reasons such as when the airplane is on the ground and when any of the parameters used in the calculation are known to be invalid. For these cases, any of a number of standard methods may be used to smoothly transition an output signal from the input value to a default value over a desired amount of time. One method is to use transition logic that ramps the output signal between zero and the input value over 1 second when the state of the engagement signal output by switching logic 102 changes between TRUE and FALSE. This method is performed by the "smooth on-off" block 104 seen in FIG. 6. The result of all these computations is the warning speed $V_{WARNING}$ that is provided to the airplane display function 106.

The following simplified examples are provided to illustrate how the calculation method in FIG. 6 provides a real-time calculation that enables the display to show the current minimum safe airspeed as thrust asymmetry changes. For a condition of stable flight with symmetric thrust, yaw rate is a constant value of zero and airplane controls are centered at their neutral positions for stable flight. The output of block 82 is zero because there is no yaw acceleration. The output of block 84 is also zero because the airplane controls are not generating any aerodynamic yawing moment. Therefore the output of the summing junction 88 is zero, as is the output of all subsequent blocks. The result of flight with symmetric thrust is that $V_{WARNING}$ has a value of zero.

When one engine fails from an initial condition of symmetric high thrust, $V_{WARNING}$ changes quickly to reflect this sudden thrust asymmetry. An immediate effect of an engine failure is that the airplane will develop a yaw rate towards the side of the failed engine. The washout filter 78 outputs a value corresponding to the yaw acceleration of the airplane and block 82 calculates the yawing moment coefficient corresponding to the yaw acceleration. Over the first several seconds after an engine failure, airplane control surfaces, such as a rudder, and airplane sideslip angle change to counteract the thrust asymmetry. At this point the output of block 84, which is the modeled yawing moment coefficient, increases in magnitude as aerodynamic effects begin to oppose the thrust asymmetry. The thrust asymmetry yawing moment coefficient also increases in magnitude due to the changes in the inputs to junction 88. This larger magnitude causes the output of the absolute value function 92 to change from zero (for symmetric thrust) to a value that may be close to the $C_n$ warning value from block 90. When the thrust asymmetry yawing moment coefficient has a magnitude close to the $C_n$ warning value, then the warning speed, $V_{WARNING}$, will be close to the current airspeed.

When the airplane has stabilized to zero yaw rate using rudder deflection and sideslip angle, then the magnitude of the thrust asymmetry yawing moment coefficient will be equal to the magnitude of the aerodynamic yawing moment coefficient which is output from block 84 through filter block 86. If the aerodynamic yawing moment produced by rudder deflection and sideslip is less than that determined to provide acceptable airplane lateral and directional control in the event of an engine failure, then the output of block 92 will be less than the $C_n$ warning of block 90 and, therefore, $V_{WARNING}$ will be less than the current airspeed. If the amount of rudder deflection and sideslip needed to balance the thrust asymmetry is more than is defined as acceptable, then the output of block 92 will be larger than the $C_n$ warning of block 90 and, therefore, $V_{WARNING}$ will be greater than the current airspeed. To restore acceptable control in this situation, the airplane needs to be flown at a higher airspeed or with a lower thrust asymmetry.

When the airplane flight conditions change such that the thrust of the operating engines can be reduced from high thrust, such as when the airplane no longer needs to climb to higher altitude, the thrust asymmetry will be correspondingly reduced. For simplicity of this example, assume that this reduction in thrust asymmetry is controlled by a corresponding reduction in rudder deflection such that airplane yaw rate remains zero. In this situation, the output of block 84 will reduce in magnitude due to the smaller aerodynamic yawing moment generated by the reduced rudder deflection. This has the effect of reducing the magnitude of the thrust asymmetry yawing moment coefficient and reducing the value of the warning speed, $V_{WARNING}$, relative to the current airspeed.

Figure 7:
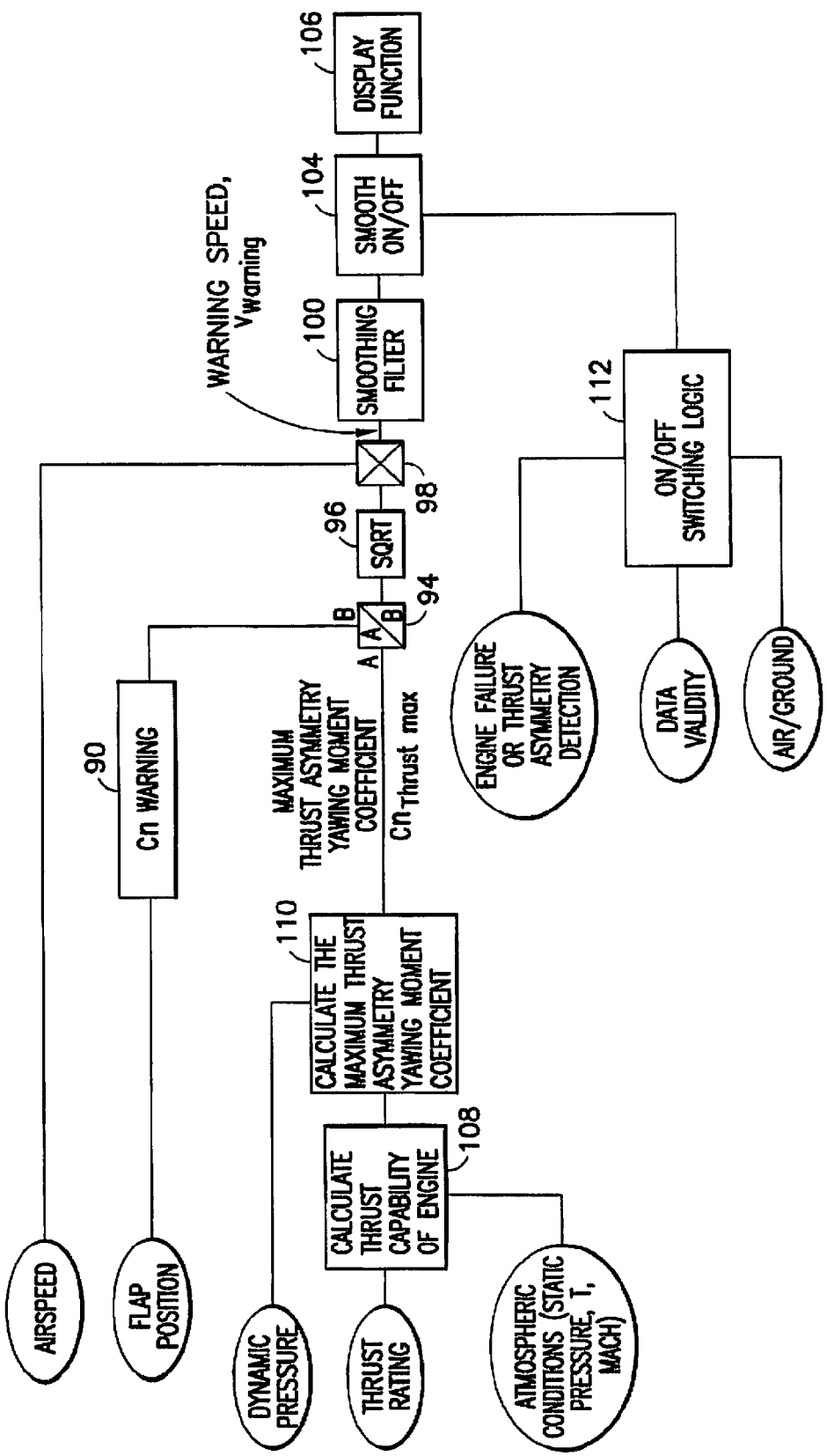
FIG. 7 is a block diagram showing another method for calculating and displaying a warning speed for thrust asymmetry control.

FIG. 7 is a flowchart showing a variation of the method depicted in FIG. 6. This variation is a simplification where the warning speed is calculated based on the maximum possible thrust asymmetry given the engine thrust capability at the current flight condition regardless of the actual thrust asymmetry. The warning speed could be displayed all the time or only when a threshold level of thrust asymmetry is detected.

More specifically, FIG. 7 shows a different method for calculating the thrust asymmetry yawing moment coefficient. First, block 108 calculates the thrust capability of the engine. This process contains a model of the maximum thrust capability of the engine. This may be implemented using as many input signals as are needed and available to model the thrust capability to the desired accuracy. This type of calculation is familiar to those practiced in the art of airplane propulsion systems.

Then block 110 calculates the maximum thrust asymmetry yawing moment coefficient. Converting maximum thrust to maximum thrust asymmetry yawing moment coefficient may be done with the following equation for twin engine airplanes with symmetrically positioned engines on the left and right side of the airplane:

$$C_{n_{Thrust_{max}}} = (Thrust_{max} - Thrust_{failed\_engine}) \cdot (y_{engine} / \bar{q} \cdot S \cdot b)$$

where the thrust of a failed engine $Thrust_{failed\_engine}$ is approximated as a constant or estimated with typical methods; the engine lateral distance from the airplane centerline $y_{engine}$ is a known constant; dynamic pressure $\bar{q}$ is known from airplane air data systems; and the values of wing area S and wing span b are known constants for the airplane. For an airplane with a different number of engines or different engine locations, this equation can be easily be adapted by those practiced in the art of airplane design.

The next several calculation steps are identical to those in method depicted in FIG. 6. A difference comes in the on/off switching logic 112. In this function, a signal that indicates an engine failure or a thrust asymmetry condition may be used as additional criteria to determine if the calculated $V_{WARNING}$ will be displayed on the cockpit instrumentation. This allows the warning speed to be displayed only in cases of a large thrust asymmetry. There are a number of methods that are generally known to detect an engine failure or a large thrust asymmetry.

The proximity of the warning speed to current airspeed provides an indication of the amount of rudder remaining after control of a thrust asymmetry has been achieved and the speed difference is proportional to the amount of rudder remaining. This can be seen from the equation for the warning speed where it is calculated from the thrust asymmetry yawing moment coefficient and the current airspeed.

Four embodiments of a software module for providing a roll rate limit to a conventional roll rate command system have been disclosed with reference to FIGS. 2 through 5. In the embodiment of FIG. 2, an alternate maximum roll rate is specified and the calculation of the maximum commendable roll rate uses hysteresis logic to switch between the nominal and alternate maximum roll rates. This embodiment uses actual asymmetric thrust yawing moment coefficient as the flight parameter with which to trigger the switching between roll rate limits. In the embodiment of FIG. 3, an alternate maximum roll rate is specified, using hysteresis logic to switch between roll rate limits but the flight parameter used to trigger the switching is the maximum possible asymmetric thrust yawing moment coefficient. In accordance with an alternative embodiment, the difference between the airspeed of the aircraft and an asymmetric thrust warning speed is the monitored flight parameter used to trigger the switching. Further, in the embodiment of FIG. 4, a roll rate limit factor is multiplied with the nominal maximum commendable roll rate using a schedule of values for the limit factor representing a continuous function and using maximum possible asymmetric thrust yawing moment coefficient as the flight parameter on which the schedule is based. In the embodiment of FIG. 5, a similar method is used for a roll rate limit factor and schedule of values but the difference between the airspeed of the aircraft and an asymmetric thrust warning speed is used as the flight parameter on which the schedule is based. In accordance with an alternative embodiment, actual asymmetric thrust yawing moment coefficient is the monitored flight parameter on which the schedule is based.

In addition, it should be appreciated that other alternative embodiments are within the scope of the invention, including three embodiments that use hysteresis logic to switch between nominal and alternate roll rate limit factors and three embodiments that use a schedule of values for maximum roll rate representing a continuous function to calculate a reduced maximum roll rate. The three alternative embodiments in each group respectively use a respective one of the aforementioned flight parameters, namely, asymmetric thrust yawing moment coefficient, maximum possible asymmetric thrust yawing moment coefficient, or the difference between the airspeed of the aircraft and an asymmetric thrust warning speed.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

As used in the claims, the term "computer system" should be construed broadly to encompass a system having at least one computer.

The invention claimed is:

1. A method of varying roll rate limits of an aircraft while flying with thrust asymmetry, comprising:
    (a) calculating a value of a flight parameter indicative of thrust asymmetry;
    (b) applying either a nominal maximum commandable roll rate or a reduced maximum commandable roll rate less than said nominal maximum commandable roll rate in a roll rate command system, said nominal maximum commandable roll rate being applied in response to said calculated flight parameter value being less than a lower threshold value, and said reduced maximum commandable roll rate being applied instead of said nominal maximum commandable roll rate in response to said calculated flight parameter value increasing from a value less than an upper threshold value to a value greater than said upper threshold value, said upper threshold value being greater than said lower threshold value; and
    (c) controlling deflection of control surfaces of the aircraft so that the roll rate of the aircraft, after receipt of a roll rate command from a pilot, does not exceed the applied maximum commandable roll rate.

2. The method as recited in claim 1, wherein said flight parameter is selected from a group comprising an asymmetric thrust yawing moment coefficient, a maximum possible asymmetric thrust yawing moment coefficient, and a difference between the airspeed of the aircraft and an asymmetric thrust warning speed.

3. The method as recited in claim 1, wherein step (b) further comprises applying said nominal maximum commandable roll rate in response to said calculated flight parameter value decreasing from a value greater than said upper threshold value to a value less than said lower threshold value.

4. The method as recited in claim 1, further comprising deriving said reduced maximum commandable roll rate by multiplying said nominal maximum commandable roll rate by a roll rate limit factor less than unity in response to said calculated flight parameter value increasing from a value less than said upper threshold value to a value greater than said upper threshold value.

5. The method as recited in claim 4, further comprising multiplying said nominal maximum commandable roll rate by a roll rate limit factor equal to unity in response to said calculated flight parameter value decreasing from a value greater than said upper threshold value to a value less than said lower threshold value.

6. The method as recited in claim 1, wherein step (c) is performed when additional rudder deflection is not available.

7. A method of varying roll rate limits of an aircraft while flying with thrust asymmetry, comprising:
(a) calculating a value of a flight parameter indicative of thrust asymmetry;
(b) applying a maximum commandable roll rate in a roll rate command system, said maximum commandable roll rate being a function of said calculated flight parameter value when said calculated flight parameter value is in a range bounded by upper and lower threshold values; and
(c) controlling deflection of control surfaces of the aircraft so that the roll rate of the aircraft, after receipt of a roll rate command from a pilot, does not exceed the applied maximum commandable roll rate.

8. The method as recited in claim 7, wherein said flight parameter is selected from a group comprising an asymmetric thrust yawing moment coefficient, a maximum possible asymmetric thrust yawing moment coefficient, and a difference between the airspeed of the aircraft and an asymmetric thrust warning speed.

9. The method as recited in claim 7, further comprising:
selecting a roll rate limit factor from a schedule of roll rate limit factors in dependence on said calculated flight parameter value; and
calculating said maximum commandable roll rate by multiplying a nominal maximum commandable roll rate by said selected roll rate limit factor.

10. The method as recited in claim 7, wherein step (c) is performed when additional rudder deflection is not available.

11. A system for varying roll rate limits of an aircraft while flying with thrust asymmetry, comprising a computer system, first and second control surfaces, and first and second actuators respectively coupled to said first and second control surfaces, wherein said computer system is programmed to execute the following operations:
(a) monitoring a value of a flight parameter indicative of thrust asymmetry as the aircraft flies with thrust asymmetry;
(b) reducing a maximum commandable roll rate in response to said value of said flight parameter increasing from a value less than an upper threshold value to a value greater than said upper threshold value; and
(c) controlling deflection of said first and second control surfaces of the aircraft via said first and second actuators so that the roll rate of the aircraft, after receipt of a roll rate command from a pilot, does not exceed said reduced maximum commandable roll rate.

12. The system as recited in claim 11, wherein said flight parameter is selected from a group comprising an asymmetric thrust yawing moment coefficient, a maximum possible asymmetric thrust yawing moment coefficient, and a difference between the airspeed of the aircraft and an asymmetric thrust warning speed.

13. The system as recited in claim 11, wherein said computer system is further programmed to apply a nominal maximum commandable roll rate in response to said calculated flight parameter value decreasing from a value greater than said upper threshold value to a value less than a lower threshold value that is less than said upper threshold value.

14. The system as recited in claim 11, wherein said computer system is further programmed to calculate said reduced maximum commandable roll rate by multiplying a nominal maximum commandable roll rate by a roll rate limit factor less than unity in response to said calculated flight parameter value increasing from a value less than said upper threshold value to a value greater than said upper threshold value.

15. The system as recited in claim 14, wherein said computer system is further programmed to multiply said nominal maximum commandable roll rate by a roll rate limit factor equal to unity in response to said calculated flight parameter value decreasing from a value greater than said upper threshold value to a value less than a lower threshold value that is less than said upper threshold value.

16. A system for varying roll rate limits of an aircraft while flying with thrust asymmetry, comprising a computer system, first and second control surfaces, and first and second actuators respectively coupled to said first and second control surfaces, wherein said computer system is programmed to execute the following operations:
(a) monitoring a value of a flight parameter indicative of thrust asymmetry as the aircraft flies with thrust asymmetry;
(b) determining a maximum commandable roll rate, said maximum commandable roll rate being a function of said calculated flight parameter value when said calculated flight parameter value is in a range bounded by upper and lower threshold values; and
(c) controlling deflection of said first and second control surfaces of the aircraft via said first and second actuators so that the roll rate of the aircraft, after receipt of a roll rate command from a pilot, does not exceed said maximum commandable roll rate.

17. The system as recited in claim 16, wherein said flight parameter is selected from a group comprising an asymmetric thrust yawing moment coefficient, a maximum possible asymmetric thrust yawing moment coefficient, and a difference between the airspeed of the aircraft and an asymmetric thrust warning speed.

18. The system as recited in claim 16, wherein operation (b) comprises:
selecting a roll rate limit factor from a schedule of roll rate limit factors in dependence on said calculated flight parameter value; and
calculating said maximum commandable roll rate by multiplying a nominal maximum commandable roll rate by said selected roll rate limit factor.

19. A system for assuring a desired control margin on a multi-engine aircraft for roll maneuvers conducted with a large thrust asymmetry, comprising a computer system with logic to automatically reduce the limit on commanded roll rate when a flight parameter indicates asymmetric thrust conditions and additional rudder deflection is not available to achieve desired roll characteristics at higher roll rates.

20. The system as recited in claim 19, wherein said flight parameter is selected from a group comprising an asymmetric thrust yawing moment coefficient, a maximum possible asymmetric thrust yawing moment coefficient, and a difference between the airspeed of the aircraft and an asymmetric thrust warning speed.

* * * * *